UNITED STATES PATENT OFFICE.

GEORGE L. AND CHARLES H. EAGAN, OF SAN FRANCISCO, CALIFORINA.

IMPROVEMENT IN COMPOSITION FOR ROOFS.

Specification forming part of Letters Patent No. 62,619, dated March 5, 1867.

*To all whom it may concern:*

Be it known we, GEORGE L. EAGAN and CHARLES H. EAGAN, of the city and county of San Francisco, and State of California, have invented a new and Improved Composition of Matter, to wit: a concrete designed to be used for drain-pipes, moldings, roofs, pavements, and other similar purposes; and we do hereby declare that the following is a full and exact description thereof.

The ingredients of our composition are as follows: First, three parts by weight of coal-tar, pitch, or other equivalent tenacious substance; second, two parts by weight of refuse gas-lime; third, so much dry pulverized clay as may be necessary to render the composition of the consistency desired.

To prepare the refuse lime for use it should be boiled in water for about one hour, and then be drained and thoroughly dried and pulverized.

These ingredients should be united in the following manner: The pitch should be melted and heated until ebullition commences. The lime should then be thoroughly stirred and mixed into the boiling pitch, and this mixture allowed to remain, undisturbed, at the same heat for about ten minutes, when the clay should be stirred into it by degrees, in the same manner as meal in making a hasty pudding, until the consistency equals that of thick mortar. While in this state the composition should be well stirred and thoroughly mixed, and put into molds and pressed therein. The greater the pressure the better the result. On cooling, the concrete is removed from the molds and ready for use.

We claim as new and desire to secure by Letters Patent—

The composition for the manufacture of drain-pipes, moldings, roofing, &c., the ingredients of which are prepared and combined in the proportions and manner substantially as herein described.

GEORGE L. EAGAN.
C. H. EAGAN.

Witnesses:
ALFRED RIX,
EDWD. NUNAN.